O. OLSEN.
PNEUMATIC PRESSURE GAGE.
APPLICATION FILED OCT. 6, 1909.

996,358.

Patented June 27, 1911.

Witnesses:
R. S. Berry
F. E. Maynard

Inventor,
Ole Olsen.
By G. H. Strong.
His Attorney.

ered ancesign# UNITED STATES PATENT OFFICE.

OLE OLSEN, OF FRUITVALE, CALIFORNIA.

PNEUMATIC PRESSURE-GAGE.

996,358.

Specification of Letters Patent.  Patented June 27, 1911.

Application filed October 6, 1909. Serial No. 521,391.

*To all whom it may concern:*

Be it known that I, OLE OLSEN, a citizen of the United States, residing at Fruitvale, in the county of Alameda and State of California, have invented new and useful Improvements in Pneumatic Pressure-Gages, of which the following is a specification.

My invention relates to pneumatic pressure gages.

It is especially designed for determining pressures, and is particularly applicable to determining pressure in the tires of automobiles, and in like places where air is held under compression, and where it is desired to ascertain the exact amount of pressure.

It consists in a combination of parts, and in details of construction which will be more fully explained by reference to the accompanying drawings, in which—

Figure 1:
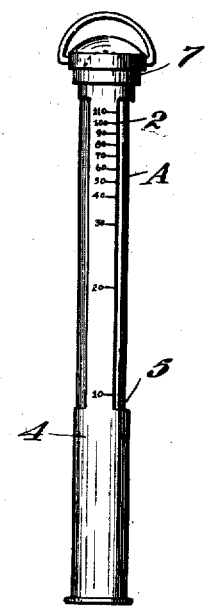
Figure 2:
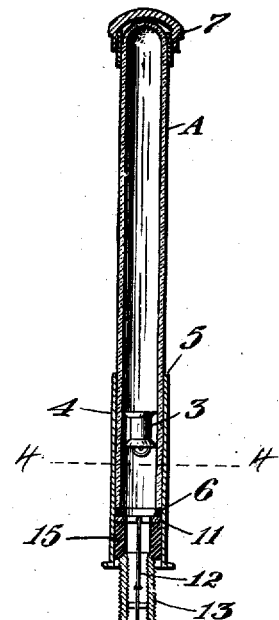
Figure 3:
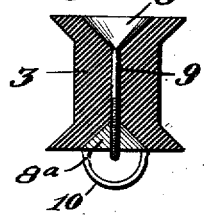
Figure 4:
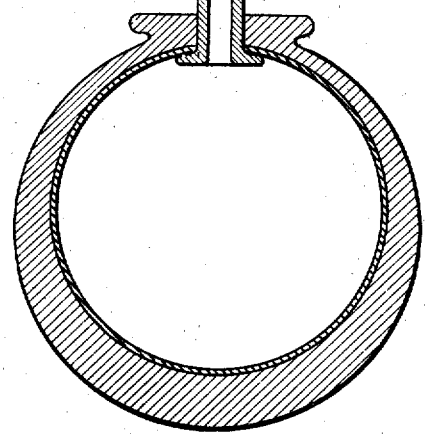
Figure 4:

Figure 1 is an exterior view. Fig. 2 is a sectional elevation, showing the application of the device. Fig. 3 is a view of the piston or plunger, and the adjusting means. Fig. 4 is a section on line 4—4 Fig. 2.

A is a tube which may be made of glass or other transparent material; or may have a portion made transparent for the purpose of inspection. The upper end of the tube is closed, and its sides are graduated with marks as at 2; these marks being determined by actual test and adapted to indicate the amount of compression attained within the tube, as will be hereafter described. Within the tube is a piston or plunger 3, and this plunger fits snugly within the tube so that the body of air is confined between the plunger and the upper closed end of the tube. The lower end of the tube is adapted to be fitted to the part containing the fluid under pressure, and which pressure it is desired to exactly ascertain.

It will be manifest that when the pressure is admitted into the lower end of the tube it will force the plunger upward, and will compress the air in the sealed upper portion of the tube until the two pressures are substantially equal. By reading the indicating marks on the side of the tube, with which marks the top of the plunger coincides, the amount of pressure will be at once indicated; when the device is removed the expansion of the air in the upper part of the tube will return the plunger to substantially its normal position.

For convenience of construction, and to protect the fragile glass tube, I have shown an exterior tube 4 which may be made of metal, hard rubber, or other suitable material. This tube has the sides made open as shown at 5.

Within the tube near the lower end, is a washer 6, against which the lower end of the glass tube may fit, when it is inserted, and thus form a joint at this point. The upper end of the glass tube may be protected by a removable cap 7 which may be provided with a ring or other means for conveniently suspending it when not in use.

For convenience I have shown the containing tube as marked with the graduations instead of marking them upon the inner transparent tube, the lines of graduation approaching the edges of the open slots in the outer tube, and thus indicating the amount of compression by the position of the interior plunger with relation to these marks.

In order to maintain the plunger 3 tight, and to regulate it in case of leakage, I have shown a cone 8 which fits a conical depression in one end of the plunger 3. This cone has a screw-threaded stem 9 which extends through the center of the plunger 3, and is adapted to receive a second cone 8ª which also fits in a corresponding depression in that end of the plunger. This cone may conveniently be provided with a ring or loop 10 by which it can be turned. The parts then being assembled, it will be seen that by screwing the cone 8ª upon the stem 9, the two cones will be drawn toward each other, and the elastic plunger will be correspondingly expanded and caused to fit as closely as may be desired within the tube. In this manner, if any leakage occurs or undesirable change in position of the plunger, the latter may be adjusted and made tight so that it will again operate accurately when pressure is applied to it.

11 is a perforated diaphragm, near the lower end of the exterior inclosing shell, and upon this diaphragm the annular washer 6 rests and forms a joint for the lower end of the transparent tube as previously described. From the center of this diaphragm a pin 12 extends axially downward, and its lower end is preferably made concave.

The lower end of the exterior tube 4 is adapted to rest upon the tube 13 of the pneumatic air valve, which is employed in connection with tires of this class so that when the device is applied, the lower end of the tube being placed upon the end of the valve tube, and forming a joint therewith, the fixed pin will contact with the stem of the air valve, thus unseating the air valve, and allowing air to enter the interior tube. This compressed air instantly forces the plunger up within its tube until compression equal to that within the tire has been formed within the closed end of the tube. The amount of this compression is then read by the position of the plunger with relation to the graduations upon the tube.

15 is an elastic sleeve or washer which fits into the lower end of the exterior tube 4, and serves to form a joint with the valve-containing tube so that by simply pressing the device upon said tube, and in alinement therewith, the joint is formed, and the valve is simultaneously unseated to allow the amount of compression to be shown as above described.

By this construction I am enabled to dispense with all supplemental springs or projecting gage rods or stems, and to provide means for instantly and accurately adjusting the device and maintaining the plunger in a tight working condition.

The top of the plunger 3 is preferably coated with a suitable phosphorescent substance, such as glue, or lacquer mixed with phosphorus, for the purpose of enabling it to be inspected at night.

Having thus described my invention; what I claim and desire to secure by Letters Patent is—

1. A pneumatic pressure gage comprising inner and outer tubes, said outer tube inclosing the lower portion of the inner tube and having an opening in its side through which the inner tube is exposed and having graduations on its side adjacent said opening, the inner tube being transparent and closed at one end and the outer tube having a removable cap at the upper end into which the upper end of the transparent tube extends, a plunger operating within the inner tube and against which escaping fluid acts to form a pressure in the portion of said tube above this plunger, said graduations indicating the amount of pressure, and an elastic sleeve fitted in the lower end of the exterior tube and serving to form a tight joint with a part to which the gage is fitted.

2. A pneumatic pressure gage comprising inner and outer tubes, said outer tube inclosing the lower portion of the inner tube and having an opening in its side through which the inner tube is exposed and having graduations on its side adjacent said opening, the inner tube being transparent and closed at one end and the outer tube having a removable cap at the upper end into which the upper end of the transparent tube extends, a plunger operating within the inner tube and against which escaping fluid acts to form pressure in the portion of said tube above the plunger, said graduations indicating the amount of said pressure, an elastic sleeve fitted in the lower end of the exterior tube and serving to form a tight joint with a part to which the gage is fitted, and a perforated diaphragm within the outer tube and confined between the upper end of said sleeve and the lower end of the inner tube, said diaphragm having an outwardly projecting pin which extends beyond the lower end of the exterior tube.

3. An improved pressure gage having in combination inner and outer tubes, said inner tube being closed at one end, and said outer tube inclosing the lower end of the inner tube and being open on the side to expose the inner tube and having a removable cap at the top to which the closed end of the inner tube is fitted, and a plunger operating in the inner tube, said plunger compressing fluid between itself and the outer end of the inner tube, and said outer tube having graduations for indicating the amount of said compression.

4. A gage of the character described comprising an outer casing having an open and a closed end, and adapted to be fitted over a tire valve casing, said outer casing being provided with a side opening and a pressure scale, a transparent casing with closed and open ends, fitted within said outer casing, and having its open end terminating at a short distance from the open end of the outer casing, a piston consisting of a short plug fitting tightly within said transparent casing, and movable from end to end of said casing, a plug located in the open end of said outer casing, a member located between said piston and said plug and having a projection extending through said plug and adapted to act upon the tire valve to permit air from a tire to enter said transparent casing, and move said piston longitudinally in the transparent casing to any distance.

5. A gage of the character described comprising a metallic outer casing provided with side openings and a pressure scale, a transparent casing having a closed and an open end, and tightly fitting within said outer casing and terminating a little distance from one end of said outer casing, said outer casing being adapted to engage with the tire valve, a piston consisting of a short cylinder with heads at each end fitting within said transparent casing and movable from end to end of said casing by air pressure, a plug having a small perforation in its center located in the said one end of said outer casing and a perforated disk located in said outer casing between the plug and the piston, said disk having a stem extending through said plug, and adapted to open the tire valve and admit air from the tire to said transparent casing.

6. A gage comprising an inner transparent casing having an open and a closed end, a metallic casing inclosing the same and provided with sight openings and pressure scales, said metallic casing having an open end projecting beyond the open end of the transparent casing, a perforated washer held in contact with the open end of said transparent casing, a plug in said projected end of the metallic casing and provided with an opening, a perforated disk interposed between the plug and the washer, a stem for said disk projecting through the opening of said plug and adapted to open a tire valve when the gage is in contact with the casing thereof, and a piston slidable in said transparent casing and coöperating with said scales to register the air pressure from a tire.

In testimony whereof I have hereunto set my hand in the presence of two subscribing witnesses.

OLE OLSEN.

Witnesses:
   CHARLES A. PENFIELD,
   RAYMOND A. LEONARD.